(12) United States Patent
Lau

(10) Patent No.: US 7,554,958 B2
(45) Date of Patent: Jun. 30, 2009

(54) APPARATUS AND METHOD FOR SERVING DATA

(75) Inventor: James Sheung Lau, Toronto (CA)

(73) Assignee: International;Business Machines Corporation, Armonk, NY (US)

( * ) Notice: Subject to any disclaimer, the term of this patent is extended or adjusted under 35 U.S.C. 154(b) by 1107 days.

(21) Appl. No.: 10/017,006

(22) Filed: Dec. 14, 2001

(65) Prior Publication Data

US 2002/0075843 A1 Jun. 20, 2002

(30) Foreign Application Priority Data

Dec. 15, 2000 (CA) .................................. 2328633

(51) Int. Cl.
*H04Q 7/24* (2006.01)
(52) U.S. Cl. ...................... 370/338; 370/401
(58) Field of Classification Search ................. 370/349, 370/395, 52, 351, 352, 401, 403, 465, 389; 709/203, 218, 216, 228, 229, 234, 235, 245, 709/219; 707/203; 713/170, 182; 710/10
See application file for complete search history.

(56) References Cited

U.S. PATENT DOCUMENTS

| | | | | |
|---|---|---|---|---|
| 6,119,167 | A * | 9/2000 | Boyle et al. | 709/234 |
| 6,480,957 | B1 * | 11/2002 | Liao et al. | 713/170 |
| 6,654,786 | B1 * | 11/2003 | Fox et al. | 709/203 |
| 2002/0002603 | A1 * | 1/2002 | Vange | 709/219 |
| 2002/0004796 | A1 * | 1/2002 | Vange et al. | 707/10 |
| 2002/0026524 | A1 * | 2/2002 | Dharap | 709/236 |
| 2005/0131704 | A1 * | 6/2005 | Dragosh et al. | 704/270.1 |
| 2006/0023676 | A1 * | 2/2006 | Whitmore et al. | 370/338 |
| 2006/0167972 | A1 * | 7/2006 | Zombek et al. | 709/202 |
| 2006/0182055 | A1 * | 8/2006 | Coffee et al. | 370/328 |
| 2008/0065768 | A1 * | 3/2008 | Ortiz et al. | 709/225 |

* cited by examiner

*Primary Examiner*—Ajit Patel
(74) *Attorney, Agent, or Firm*—Douglas W. Cameron; Anne Vachon Dougherty

(57) ABSTRACT

An apparatus for serving data employs a web server and a communications interface operable to enable the web server to send and receive messages on a wireless digital packet network, to act as a wireless web server. A method of serving data involves receiving a data request message from a wireless digital packet network, requesting data from a wireless web server in response to the data request message and transmitting on the wireless digital packet network a response message including data produced by the wireless web server in response to the data request message. A method of requesting data from a server involves transmitting a message on a wireless digital packet network for use by a wireless web server operable to receive messages from the wireless digital packet network. Transmitting the message may involve producing a wireless digital packet network message containing a Transmission and Control Protocol/Internet Protocol (TCP/IP) message. The method may further involve receiving, from the wireless digital packet network, a message produced by the wireless web server.

11 Claims, 1 Drawing Sheet

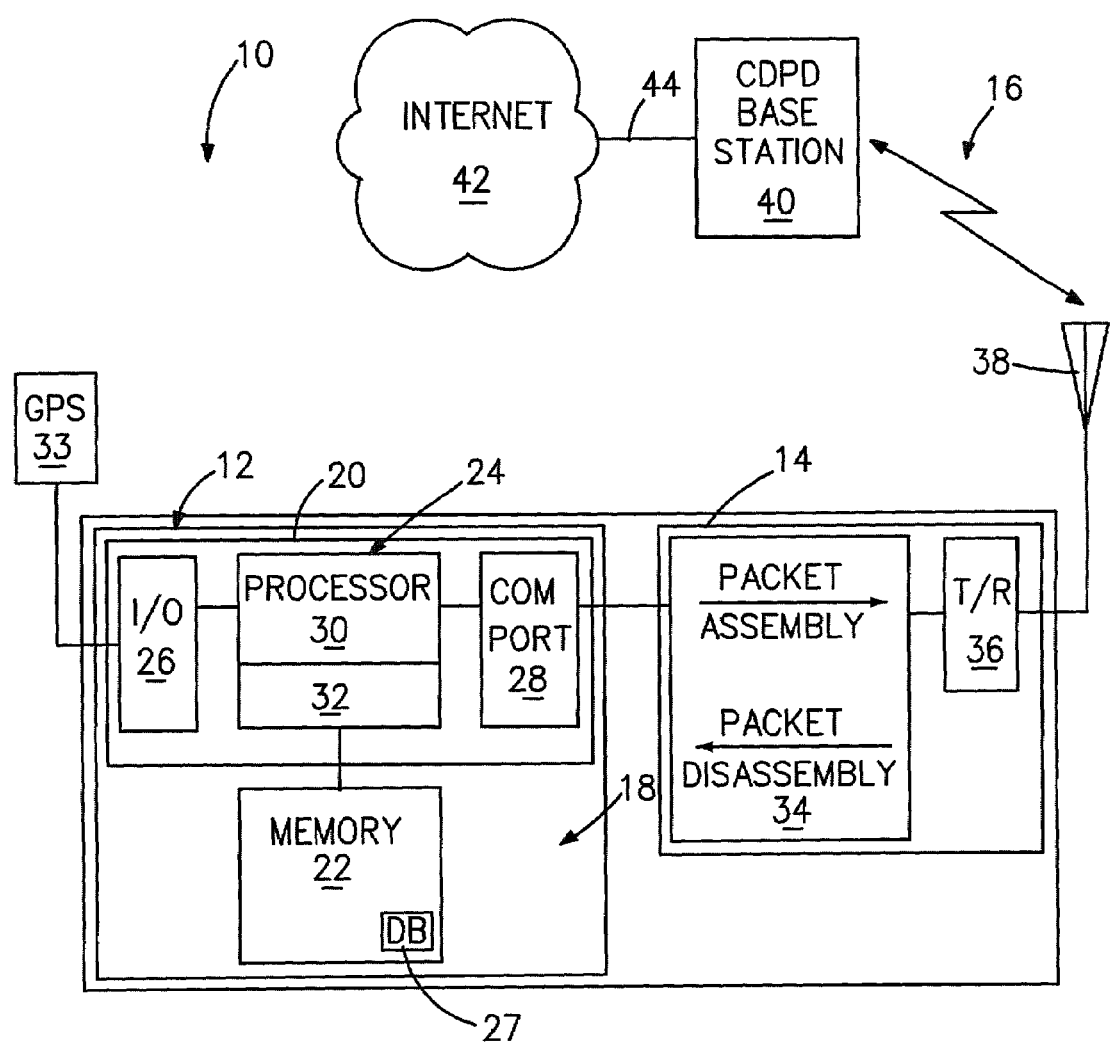

APPARATUS AND METHOD FOR SERVING DATA

FIELD OF INVENTION

The invention described herein relates to web servers and more particularly to a wireless web server operable to communicate with the world wide web, without the use of landlines.

BACKGROUND OF THE INVENTION

Web servers are commonly used to serve data to inquiring users communicating on the world wide web. Usually web servers are rather large, personal computer-sized machines operable to serve vast quantities of data, which machines remain permanently connected to a land-based network such as the world wide web on the Internet. Such web servers normally use a Transmission and Control Protocol/Internet Protocol (TCP/IP), for data signals received and transmitted by the web server and thus are compatible with conventional browsers running at user computers at various locations.

The location permanence of web servers usually requires that any information that the servers are to serve be gathered remotely and then communicated to the web server, often using the internet, for storage in a database at the web server. This communication of information to be served by the web server may be achieved in a variety of ways, including the use of a radio link between the web server and a data acquisition device. The data acquisition device may be associated with a radio transceiver, which transmits, usually on a private channel to the stationary, permanently connected land-based web server, information acquired by the data acquisition device. Thus, remote devices can communicate with the land-based web server to provide it with information that can be served to users via landlines supporting the internet.

One problem with this approach to acquiring data is that the transceiver associated with the data acquisition device is often continuously broadcasting data from its remote location to the fixed land-based web server, so that the information available from the land-based web server is always up to date or up to the minute, for example. This continuous broadcasting of information results in the requirement to continuously supply power to enable continuous broadcasting and renders the broadcast signals susceptible to detection and tapping.

What would be desirable therefore, and is an objective of the present invention, is a method and apparatus for serving data which is more mindful of energy usage, and which is less susceptible to detection and tapping.

SUMMARY OF THE INVENTION

The invention described herein addresses the above problems by providing an apparatus and method for serving data which involves a web server and a communications interface operable to convey internet messages to and from the web server using a wireless digital packet network, to permit the web server to act as a wireless web server. This permits the web server to be located remotely of conventional internet landlines and enables the webserver to be located in proximity to a data acquisition unit which acquires data for the web server to serve. Effectively, the web server becomes a wireless web server. This proximity eliminates the need to continuously broadcast acquired data to the web server as the web server and data acquisition unit can be hard wired in communication with each other, although they need not be. In addition, the communication interface may be configured such that it only broadcasts data to a receiving base station, in response to a request previously broadcast from the base station. The base station may be in communication with conventional landlines which provide access to the land based internet which allows users with access to the internet anywhere, by any means to obtain information from the wireless web server. Thus, in effect, the wireless digital packet network is used in place of landlines to convey internet messages to and from the web server. This enables the web server to be portable, permitting it to be installed in a vehicle, for example. It also enables the web server to be located in remote areas in which there is no landline access to the internet.

In accordance with one aspect of the invention there is provided an apparatus for serving data. The apparatus comprises a web server and a communications interface operable to convey internet messages to and from the web server using a wireless digital packet network.

The communications interface may be operable to transmit and receive internet messages on a cellular digital packet network and operable to receive Transmission and Control Protocol (TCP/IP) messages from the web server for transmission on the wireless digital packet network. The communications interface may be also operable to transmit internet messages according to the TCP/IP protocol to the web server. The communications interface may comprise a wireless transceiver for transmitting and sending internet messages on the wireless digital packet network.

The web server is operable to receive and store data to be served. The apparatus may further include an input interface operable to receive a signal from a sensor and produce a data representation of the signal, for storage as data to be served by the web server.

The web server and the communications interface may be connected to each other or may be joined to each other and/or may be housed in a common housing, which may be portable.

In accordance with another aspect of the invention, there is provided a method of serving data. The method comprises receiving a data request message from a wireless digital packet network, requesting data from a wireless web server in response to the data request message and transmitting on the wireless digital packet network a response message including data produced by the wireless web server in response to the data request message.

The method may further include extracting a Transmission and Control Protocol (TCP/IP) message from a wireless digital packet network protocol message and transmitting the TCP/IP message to the wireless web server.

The method may further comprise inserting a TCP/IP message from the wireless web server into a wireless digital packet network protocol message for transmission on the wireless digital packet network.

In accordance with another aspect of the invention, there is provided a method of requesting data from a server. The method comprises transmitting a message on a wireless digital packet network for use by a wireless web server operable to receive messages from the wireless digital packet network. Transmitting the message may involve producing a wireless digital packet network message containing a Transmission and Control Protocol/Internet Protocol (TCP/IP) message. The method may further involve receiving, from the wireless digital packet network, a message produced by the wireless web server.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

The invention will now be described in greater detail with reference to the accompanying drawing which comprises:

a pictorial representation of an apparatus for serving data, according to a first embodiment of the invention.

DETAILED DESCRIPTION OF THE INVENTION

Referring to the FIGURE, an apparatus for serving data, according to a first embodiment of the invention is shown generally at 10. The apparatus includes a web server shown generally at 12 and a communications interface shown generally at 14. The communications interface 14 is operable to enable the web server 12 to send and receive messages on a wireless digital packet network shown generally at 16 and thus, together the web server 12 and the communications interface 14 act as a wireless web server. In this embodiment, the wireless digital packet network 16 is a cellular digital packet data (CDPD) network and thus provides wireless communications coverage of a geographical area in the same manner as a cellular telephone network. Alternatively a paging network or other wireless network may be employed.

In this embodiment, the web server 12 and communications interface 14 are provided in a common compact, portable housing 17 with its own power supply, such as a battery (not shown) to form a mobile, remote unit which may be carried on a person or asset, such as a vehicle, or other equipment, for example, unlike a land-based server.

In this embodiment, the web server 12 is provided by a conventional chip set 18, which in this embodiment includes a processor circuit chip 20 and a memory chip 22, in communication with each other. Such a chip set is available from a plurality of manufacturers. The processor circuit chip 20 includes a processor circuit portion 24, an input/output (I/O) port 26 and a communications port 28. In this embodiment, the processor circuit portion 24 includes a central processing unit (CPU) 30 and a program memory portion 32 which may include volatile and non-volatile Random Access Memory, for example. The processor circuit portion 24 is in communication with the I/O port 26 and is operable to receive digital representations of signals presented to the I/O port, from signal and/or data producing devices such as sensors or other processor circuits, for example. Such sensors may include a Global Positioning System (GPS) 33, for providing signals representative of a geographical position of the unit, for example. Alternatively, aircraft, railway or shipping locators or beacons may provide geographical information signals. Other sensors may include fuel level, water level, temperature, and/or other engine condition measurement parameters, where the unit is installed on a vehicle, for example.

In addition, or alternatively, the I/O port 26 may provide for sensor devices to be temporarily connected to the I/O port. Such sensors may include heart rate monitoring devices, patient temperature monitoring devices, blood pressure monitoring devices, for example, where the unit is to be used in a paramedic application such as in an ambulance or other rescue vehicle. Or, the sensors may include an interface to an existing computer system, such as in a utility substation, for receiving signals indicative of alarms or other status conditions of systems within such substation, for example. Or, the sensors may include humidity, temperature, and pressure measurement parameters, where the unit is stored in a cargo bay of a transportation vehicle, for example.

In addition, or alternatively, the I/O port 26 may provide for receipt of audio and/or video signals, for example. Such devices would allow monitoring of environment conditions, for example.

The program memory portion 32 of the processor circuit portion 24 is programmed with codes representing instructions for directing the CPU 30 to carry out the functionality described herein, including directing the CPU to read the I/O port 26 at certain intervals, to acquire data from the I/o port and store such data in a database 27 created and maintained by the processor circuit portion 24 in a non-volatile portion of the program memory 22. The program memory 22 is thus programmed with codes which direct the CPU 30 to act as a database manager for storing a database of information received at the I/O port 26. In addition, the program memory 22 is programmed with codes which direct the CPU 30 to interact with the communications port 28, to receive messages at the communications port in accordance with the Transmission and Control Protocol/Internet Protocol (TCP/IP) and to respond to those messages with response messages in accordance with the same protocol. Incoming messages received at the communications port 28 may include conventional web server request messages which would normally be received, if the web server were connected to a landline, in accordance with the usual method by which web servers are connected for world wide web communications. Such incoming messages may be requests for data from the database by remote users navigating to the web server using conventional browsers, for example.

Outgoing messages produced by the CPU 30 are conventional web server response messages that the web server would produce if it were connected by a landline in accordance with the usual methods by which web servers are connected for world wide web communications. Outgoing messages may include conventional web server responses to queries, for example. Thus, the web server 12 functions like any land based web server would, with the exception that instead of a land-based communications channel to connect it to the internet, a wireless digital packet network is used.

While conventional land based web servers are normally designed to serve mass quantities of data, the web server 12 of this embodiment, is intended to serve a relatively small amount of data. Where portability is not a concern there is no need to provide the web server 12 as a chip set 18, and it may be provided by a conventional server computer having a form factor much like a personal computer, for example. This type of web server 12 may be fixed in a geographic location such as in a remote substation where it may be necessary to serve a relatively large amount of data for example, but where mobility of the web server is not a concern. Mobility of the web server is beneficial in some applications, but not required.

In this embodiment, the web server 12 and communications interface 14 are connected together as separate units but could be joined on a single substrate such as a circuit board, for example. Generally, the web server 12 and communications interface 14 are in close proximity to each other and each is dedicated to serving the other. For example, messages produced by the communications port 28 are received by the communications interface 14, according to the TCP/IP format. The communications interface 14 includes a packet handling unit 34 which assembles TCP/IP messages it receives from the communications port 28 into data packets according to a Cellular Digital Packet Data (CDPD) network protocol, where the TCP/IP messages are treated as payload data in such CDPD packets. CDPD packets produced in this manner are forwarded to a wireless transceiver 36, which drives an antenna 38, for transmitting the CDPD packets on the CDPD network 16, for reception by a CDPD base station 40. The CDPD base station 40 extracts the TCP/IP packets from the CDPD packets and transmits them on the internet 42 via landlines 44 in the usual manner.

Similarly, TCP/IP packets received at the base station 40 which are destined for the web server 12, are inserted as payload data in CDPD packets which are transmitted by the base station to the communications interface 14. At the communications interface 14, signals representing the CDPD packets are received at the antenna 38 and are demodulated and received by the wireless transceiver 36. The wireless transceiver 36 produces digital representations of the CDPD data packets and provides such digital representations to the packet handler 34, which extracts the TCP/IP message from the CDPD packets and provides the TCP/IP message as an incoming message to the communications port 28 for reception by the CPU 30.

It will be appreciated that the wireless transceiver 36 and base station 40 pass control signals to each other, much like cellular telephones pass such control signals to each other, so that the base station "is aware" that the transceiver is active and available. However, the web server 12 does not self initiate transfers of data from its database to requesting computers on the world wide web, but rather remains in an information gathering mode, continuously gathering and storing data until a request for data is received through the communications interface 14. Such request may be initiated by anyone having a computer operable to communicate on the internet to access a given IP address located by a Uniform Resource Locator (URL) for example, associated with the web server 12.

Thus, for example if a unit such as the device 10 shown in FIG. 1 were installed on a vehicle such as a personal automobile, for example, the unit may be continuously acquiring data from a Global Positioning System (GPS) receiver 33 regarding the whereabouts of the vehicle. In the event that the vehicle is stolen, the owner may simply use a browser on any web-connected device to navigate to the URL associated with the web server 12, in which case connection requests according to the TCP/IP protocol are ultimately received at the base station 40 and transmitted to the device 10 using the CDPD network 16. The device 10 receives such connection requests and responds with a response message which may include an HyperText Markup Language (HTML) web page including a presentation of stored or real time data from the GPS receiver 33 for example, which is first formatted by the CPU 30 and/or communications port 28 to produce a message according to the TCP/IP protocol. This message is then inserted as payload data into a message which is transmitted by the wireless transceiver 36 on the CDPD network 38. The base station 40 receives the message and extracts the TCP/IP message and transmits it back to the user over the internet so that the user sees a web page containing the current position of the vehicle.

Thus, by providing a remote web server communicating with the internet using only a wireless digital packet network, the web server can be remotely located and/or mobile enabling it to gather data at the source of the data. The use of a web server in this application enables anyone with a communications device that is web-connected to use the internet, from anywhere in the world, to access data on the web server. Thus, the data is provided in a common format used by virtually everyone with access to the internet. If only one user, or a limited number of users are provided access to the web page, using password protection for example, requests made to the server are likely to be sparse and sporadic, making it difficult to determine when the web server is communicating with a requesting user. Furthermore, broadcast equipment is substantively used only when requests or responses to requests are made, avoiding excessive use of power. Data acquisition can occur continuously in the background on any number of channels, using a hardwired system, thereby avoiding continuous broadcasting of data, resulting in reduced usage of power for broadcasting and reduced risk of detection.

While specific embodiments of the invention have been described and illustrated, such embodiments should be considered illustrative of the invention only and not as limiting the invention as construed in accordance with the accompanying claims.

Having thus described the invention, what is claimed is:

1. A portable wireless web server for serving data, the wireless web server comprising:
   a) a web server component comprising at least one storage location for storing instructions and data and processor means for generating TCP/IP internet messages; and
   b) a wireless communications interface comprising a packet handling unit for assembling TCP/IP internet messages received from the processor means into data packets according to a Cellular Digital Packet Data networking protocol, said wireless communications interface being operable to convey said data packets to and from the wireless web server using a wireless digital packet network.

2. The wireless web server of claim 1 wherein said communications interface is operable to transmit and receive said data packets on the cellular digital packet network.

3. The wireless web server of claim 1 wherein said communications interface is operable to transmit said data packets according to the TCP/IP protocol to said web server component.

4. The wireless web server of claim 1 wherein said communications interface comprises a wireless transceiver for transmitting and receiving said data packets on said wireless digital packet network.

5. The wireless web server component of claim 1 wherein said web server is operable to receive and store data to be served.

6. The wireless web server of claim 1 further including an input interface operable to receive a signal from a sensor and produce a data representation of said signal, for storage as data to be served by said wireless web server.

7. A method of serving data from a portable wireless web server having a web server component comprising a processor means for generating TCP/IP internet messages, at least one storage location for storing instructions and data and a wireless communications interface comprising a packet handling unit for assembling TCP/IP internet messages into data packets according to a Cellular Digital Packet Data networking protocol, said wireless communications interface being operable to convey data packets to and from the web server using a wireless digital packet network, the method comprising:

a) receiving at said wireless web server a data request message from a wireless digital packet network;
b) assembling TCP/IP internet messages into data packets component in response to said data request message; and
c) transmitting on said wireless digital packet network a response message including data packets produced by said wireless web server in response to said data request message.

8. The method of claim 7, further comprising extracting a Transmission and Control Protocol (TCP/IP) message from said wireless digital packet network message.

9. The method of claim 8 further comprising transmitting said TCP/IP message to said wireless web server.

10. The method of claim 7 further comprising inserting a Transmission and Control Protocol/Internet Protocol (TCP/IP) message from said wireless web server into a wireless digital packet network protocol data packet for transmission on said wireless digital packet network.

11. The method of claim 7 wherein the wireless web server receives signals from at least one sensor and wherein said packet handling unit assembles data packets in response to receipt of said signals.

* * * * *